United States Patent
Kakinuma

(10) Patent No.: US 9,944,029 B2
(45) Date of Patent: Apr. 17, 2018

(54) PROCESS FOR PRODUCING OPTICAL MATERIAL

(71) Applicant: Mitsui Chemicals, Inc., Minato-ku, Tokyo (JP)

(72) Inventor: Naoyuki Kakinuma, Omuta (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 0 days.

(21) Appl. No.: 15/119,686

(22) PCT Filed: Feb. 18, 2015

(86) PCT No.: PCT/JP2015/054417
§ 371 (c)(1),
(2) Date: Aug. 17, 2016

(87) PCT Pub. No.: WO2015/125817
PCT Pub. Date: Aug. 27, 2015

(65) Prior Publication Data
US 2017/0057184 A1 Mar. 2, 2017

(30) Foreign Application Priority Data

Feb. 20, 2014 (JP) .................................. 2014-030885

(51) Int. Cl.
| | | |
|---|---|---|
| *B29D 11/00* | (2006.01) | |
| *G02B 1/04* | (2006.01) | |
| *C08G 18/72* | (2006.01) | |
| *C08G 18/73* | (2006.01) | |
| *C08G 18/75* | (2006.01) | |
| *C08G 18/76* | (2006.01) | |
| *C08G 18/79* | (2006.01) | |
| *C08G 18/02* | (2006.01) | |
| *C08G 18/18* | (2006.01) | |
| *C08G 18/20* | (2006.01) | |
| *C08G 18/38* | (2006.01) | |
| *G02B 1/14* | (2015.01) | |
| *C08G 18/09* | (2006.01) | |
| *G02B 1/11* | (2015.01) | |
| *G02C 7/12* | (2006.01) | |
| *G02B 5/20* | (2006.01) | |
| *G02B 5/22* | (2006.01) | |

(52) U.S. Cl.
CPC ...... *B29D 11/00009* (2013.01); *C08G 18/022* (2013.01); *C08G 18/092* (2013.01); *C08G 18/1875* (2013.01); *C08G 18/2027* (2013.01); *C08G 18/3876* (2013.01); *C08G 18/725* (2013.01); *C08G 18/73* (2013.01); *C08G 18/758* (2013.01); *C08G 18/7642* (2013.01); *C08G 18/792* (2013.01); *G02B 1/04* (2013.01); *G02B 1/041* (2013.01); *G02B 1/11* (2013.01); *G02B 1/14* (2015.01); *G02C 7/12* (2013.01); *C08G 2120/00* (2013.01); *G02B 5/208* (2013.01); *G02B 5/223* (2013.01); *G02C 2202/16* (2013.01)

(58) Field of Classification Search
CPC ........ G02B 1/041; G02B 5/208; G02B 5/223; G02B 1/11; G02B 1/14; B29D 11/00009; G02C 7/12; C08G 18/2027; C08G 18/3876; C08G 18/758; C08G 18/7642
See application file for complete search history.

(56) References Cited

U.S. PATENT DOCUMENTS

| | | | | |
|---|---|---|---|---|
| 5,693,738 | A | * 12/1997 | Okazaki | ............. C08G 18/1875 |
| | | | | 264/1.1 |
| 2005/0062932 | A1 | 3/2005 | Kosaka et al. | |
| 2009/0091825 | A1 | 4/2009 | Saito et al. | |
| 2009/0259001 | A1 | 10/2009 | Kousaka | |
| 2010/0233596 | A1 | 9/2010 | Ikeda et al. | |
| 2013/0242393 | A1 | 9/2013 | Ryu et al. | |
| 2015/0331147 | A1 | 11/2015 | Ryu et al. | |

FOREIGN PATENT DOCUMENTS

| | | |
|---|---|---|
| EP | 1518873 A2 | 3/2005 |
| EP | 2065415 A1 | 6/2009 |
| JP | 10-231343 A | 9/1988 |
| JP | 2004-339329 A | 12/2004 |
| JP | 2005-121679 A | 5/2005 |
| JP | 2005-281527 A | 10/2005 |
| JP | 2006-265408 A | 10/2006 |
| JP | 2007-316595 A | 12/2007 |
| WO | WO 2008/023603 A1 | 2/2008 |
| WO | WO 2008/026727 A1 | 3/2008 |
| WO | WO 2013/132805 A1 | 9/2013 |
| WO | WO 2014/077369 A1 | 5/2014 |

OTHER PUBLICATIONS

International Search Report (PCT/ISA/210) dated May 19, 2015, by the Japanese Patent Office as the International Searching Authority for International Application No. PCT/JP2015/054417.
Written Opinion (PCT/ISA/237) dated May 19, 2015, by the Japanese Patent Office as the International Searching Authority for International Application No. PCT/JP2015/054417.
Extended Search Report issued by the European Patent Office in corresponding European Patent Application No. 15752781.3 dated Sep. 8, 2017 (8 pages).

* cited by examiner

*Primary Examiner* — Michael L Leonard
(74) *Attorney, Agent, or Firm* — Buchanan, Ingersoll & Rooney PC

(57) ABSTRACT

A process for producing an optical material of the present invention includes a step of mixing di- or higher-functional thiol compounds (A) having one or more sulfide bonds and/or one or more ester bonds with an imidazole-based curing catalyst (B) to prepare a mixed solution; a step of mixing the mixed solution with an isocyanate compound (C) including at least one kind of a di- or higher-functional alicyclic isocyanate compound (c1) and/or a di- or higher-functional aliphatic isocyanate compound (c2) to prepare a polymerizable composition for optical materials; a step of injecting the polymerizable composition for optical materials into a mold; and a step of polymerization-curing the polymerizable composition for optical materials in the mold.

9 Claims, No Drawings

PROCESS FOR PRODUCING OPTICAL MATERIAL

TECHNICAL FIELD

The present invention relates to a process for producing an optical material.

BACKGROUND ART

Compared with inorganic lenses, plastic lenses have a low weight, are not easily cracked, and can be dyed, and thus have rapidly become widespread in optical elements such as eyeglass lenses and camera lenses. Thus far, a variety of resins for lenses have been developed and used, and typical examples thereof include thiourethane resins obtained from a polymerizable composition including an isocyanate compound and a thiol compound.

Plastic lenses comprised of thiourethane resins are described in Patent Documents 1 to 5 below.

Patent Documents 1 and 2 disclose polymerizable compositions obtained by mixing a polyisocyanate compound and a polythiol compound with a prepolymer that is obtained by reacting sulfur with a compound having an epithio group using an imidazole-based catalyst as a vulcanization accelerator and plastic lenses obtained from the compositions.

Patent Document 3 discloses a photosensitive resin composition including a thiourethane compound obtained from a thiol compound and an isocyanate compound, and a photopolymerization initiator such as an imidazole compound.

Patent Document 4 discloses a process for producing a polythiourethane resin in which a polythiol oligomer and a poly (thio) isocyanate group-containing compound are reacted with each other. It is disclosed that the polythiol oligomer is obtained by reacting a di- or higher-functional polythiol compound with sulfur using an imidazole-based catalyst.

Patent Document 5 discloses a polymerizable composition including (A) a compound having one or more mercapto groups, (B1) a polyurethane prepolymer and/or a polythiourethane prepolymer in which all or some of terminals are mercapto groups, and (C) a polyisocyanate compound and/or a polyisothiocyanate compound. In addition, it is described that resins can be produced by heating and polymerizing the composition in the presence of a curing catalyst such as an imidazole. However, there are no specific examples disclosed regarding the use of imidazoles.

RELATED DOCUMENT

Patent Document

[Patent Document 1] Japanese Unexamined Patent Publication No. 2005-121679
[Patent Document 2] Japanese Unexamined Patent Publication No. 2005-281527
[Patent Document 3] Pamphlet of International Publication No. WO2008/023603
[Patent Document 4] Pamphlet of International Publication No. WO2008/026727
[Patent Document 5] Japanese Unexamined Patent Publication No. 2006-265408

SUMMARY OF THE INVENTION

Optical materials such as plastic resins obtained from the polymerizable compositions described in the above-described documents, in some cases, cause disadvantages such as striae and white turbidity and have adverse effects on the performance of optical materials, and thus there have been cases in which the yield of products decreases.

The present inventors carried out intensive studies in order to solve the above-described problem and found that, when a polymerizable composition for optical materials obtained by a process including a step of adding a specific curing catalyst to a polythiol compound to prepare a mixed solution by is used, high-quality optical materials in which the occurrence rate of striae is low, the generation of foreign material is suppressed, and, furthermore, optical properties such as a refractive index are excellent can be obtained.

The present invention can be described as below.

[1] A process for producing an optical material, comprising:

a step of mixing di- or higher-functional thiol compounds (A) having one or more sulfide bonds and/or one or more ester bonds with an imidazole-based curing catalyst (B) to prepare a mixed solution;

a step of mixing the mixed solution with an isocyanate compound (C) including at least one kind of a di- or higher-functional alicyclic isocyanate compound (c1) and/or a di- or higher-functional aliphatic isocyanate compound (c2) to prepare a polymerizable composition for optical materials;

a step of injecting the polymerizable composition for optical materials into a mold; and a step of polymerization-curing the polymerizable composition for optical materials in the mold.

[2] The process for producing an optical material according to [1], wherein the imidazole-based curing catalyst (B) includes at least one kind of compounds represented by following General Formula (2)

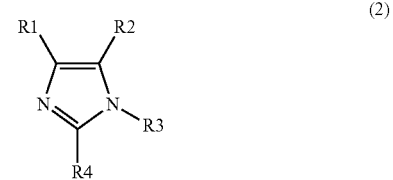

wherein, in the formula, each of R1, R2, R3, and R4 independently represents hydrogen, a mercapto group, a cyano group, an optionally substituted alkyl group, or an optionally substituted phenyl group, and R1, R2, R3, and R4 may be identical to or different from each other.

[3] The process for producing an optical material according to [1] or [2], wherein the imidazole-based curing catalyst (B) is at least one kind selected from the group consisting of dimethylimidazole and benzylmethylimidazole.

[4] The process for producing an optical material according to any one of [1] to [3], wherein the alicyclic isocyanate compound (c1) is at least one kind selected from the group consisting of 1,3-bis(isocyanatomethyl)cyclohexane, 1,4-bis(isocyanatomethyl)cyclohexane, bis(4-isocyanatocyclohexyl)methane, bis(isocyanatomethyl)-bicyclo[2.2.1] heptane, and isophorone diisocyanate, and the aliphatic isocyanate compound (c2) is at least one kind selected from the group consisting of m-xylylene diisocyanate, 1,5-pentamethylene diisocyanate, 1,6-hexamethylene diisocyanate, 1,7-heptamethylene diisocyanate, lysine diisocyanate, lysine triisocyanate, dimer acid diisocyanates, octamethylene diisocyanate and decamethylene diisocyanate, and modified products thereof.

[5] The process for producing an optical material according to any one of [1] to [4], wherein, among the thiol compounds (A), the di- or higher-functional thiol compound having one or more sulfide bonds is at least one kind selected from the group consisting of 4-mercaptomethyl-1,8-dimercapto-3,6-dithiaoctane, 4,8 or 4,7 or 5,7-dimercaptomethyl-1,11-dimercapto-3,6,9-trithiaundecane, bis(mercaptoethyl) sulfide, 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane.

[6] The process for producing an optical material according to any one of [1] to [5], wherein, among the thiol compounds (A), the di- or higher-functional thiol compound having one or more ester bonds is at least one kind selected from the group consisting of pentaerythritol tetrakis(2-mercaptoacetate), pentaerythritol tetrakis(3-mercaptopropionate), and thiol compounds represented by following General Formula (1):

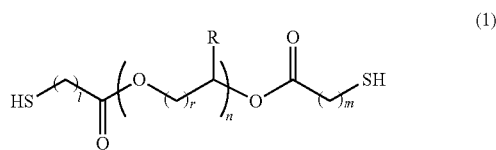

(1)

wherein, in the formula, 1, m, and r independently represent integers of 1 to 4, and n represents an integer of 1 to 3, R represents hydrogen or a methyl group, and, in a case in which multiple R's are present, R's may be identical to or different from each other.

[7] The process for producing an optical material according to [6], wherein, in the thiol compounds represented by General Formula (1), 1 and m independently represent integers of 1 or 2, r represents an integer of 1 to 3, and n represents 1 or 2.

[8] An optical material obtained by the process according to any one of [1] to [7].

[9] A process for producing a plastic eyeglass lens, comprising:

the steps contained in the process according to any one of [1] to [7].

[10] The process for producing a plastic eyeglass lens according to [9], wherein a lens base material is prepared by using the step of polymerization-curing the polymerizable composition for optical materials in the mold, further comprising:

a step of forming a primer layer, a hard coat layer, and an antireflection layer in this order over at least one surface of the lens base material.

[11] A plastic eyeglass lens obtained by the process according to [9] or [10].

[12] A process for producing a plastic polarizing lens, comprising:

a step of fixing a polarizing film to an inside of a mold for lens casting in a state in which at least one surface of the polarizing film is separated from the mold;

a step of mixing di- or higher-functional thiol compounds (A) having one or more sulfide bonds and/or one or more ester bonds and an imidazole-based curing catalyst (B) to prepare a mixed solution;

a step of mixing the mixed solution with an isocyanate compound (C) including at least one kind of a di- or higher-functional alicyclic isocyanate compound (c1) and/or a di- or higher-functional aliphatic isocyanate compound (c2) to prepare a polymerizable composition for optical materials;

a step of injecting the polymerizable composition for optical materials into a space between the polarizing film and the mold; and a step of polymerization-curing the polymerizable composition for optical materials to laminate a layer comprised of a polythiourethane resin over at least one surface of the polarizing film by.

[13] A plastic polarizing lens obtained by the process according to [12].

According to the process for producing an optical material of the present invention, it is possible to provide an optical material in which the occurrence rate of striae is low, the generation of foreign material is suppressed, and properties such as a refractive index, an Abbe number, and heat resistance are also excellent.

DESCRIPTION OF EMBODIMENTS

A process for producing an optical material of the present invention will be described on the basis of the following embodiment.

A process for producing an optical material of the present embodiment includes the following steps.

Step a: (A) di- or higher-functional thiol compounds having one or more sulfide bonds and/or one or more ester bonds is mixed with (B) an imidazole-based curing catalyst to prepare a mixed solution.

Step b: the mixed solution is mixed with (C) an isocyanate compound including at least one kind of a di- or higher-functional alicyclic isocyanate compound (c1) and/or a di- or higher-functional aliphatic isocyanate compound (c2) to prepare a polymerizable composition for optical materials.

Step c: The polymerizable composition for optical materials is injected into a mold.

Step d: The polymerizable composition for optical materials is polymerization-cured in the mold.

<Step a>

In the present step, a mixed solution of (A) di- or higher-functional thiol compounds having one or more sulfide bonds and/or one or more ester bonds and (B) an imidazole-based curing catalyst is prepared.

First, the respective components will be described.

[Thiol compounds (A)]

The thiol compounds (A) are di- or higher-functional thiol compounds having one or more sulfide bonds and/or one or more ester bonds.

Specific examples of the thiol compounds (A) include (a1) di- or higher-functional thiol compounds having one or more sulfide bonds (hereinafter, also abbreviated as the "thiol compounds (a1)"), (a2) di- or higher-functional thiol compounds having one or more ester bonds (hereinafter, also abbreviated as the "thiol compounds (a2)"), and (a3) di- or higher-functional thiol compounds having one or more sulfide bonds and/or one or more ester bonds (hereinafter, also abbreviated as the "thiol compounds (a3)").

As the thiol compounds (A), thiol compounds produced using either a natural product-derived (plant-derived) raw material or a fossil-derived raw material may be used.

Examples of the thiol compounds (A) include one or more compounds selected from compounds belonged to any one of the thiol compounds (a1) to (a3), one or more compounds selected from compounds belonged to any two of the thiol compounds (a1) to (a3), and one or more compounds selected from compounds belonged to the thiol compounds (a1) to (a3).

In the present embodiment, as the thiol compounds (A), one or more compounds selected from the thiol compounds (a1) and the thiol compounds (a2) are preferably used, and, more preferably, it is possible to use a combination of compounds selected only from the thiol compounds (a1) or one or more compounds selected from compounds belonged to the thiol compounds (a1) and one or more compounds selected from compounds belonged to the thiol compounds (a2).

The thiol compounds (a1) are compounds having one or more sulfide bonds and having two or more SH groups.

Specific examples of the thiol compounds (a1) include 4-mercaptomethyl-1,8-dimercapto-3,6-dithiaoctane, 4,8 or 4,7 or 5,7-dimercaptomethyl-1,11-dimercapto-3,6,9-trithiaundecane, tetrakis(mercaptomethyl)methane, bis(mercaptomethyl) sulfide, 2,5-bis(mercaptomethyl)-1,4-dithiane, bis(mercaptomethyl) disulfide, bis(mercaptoethyl) sulfide, bis(mercaptoethyl) disulfide, bis(mercaptomethylthio) methane, bis(2-mercaptoethylthio) methane, 1,2-bis(mercaptomethylthio) ethane, 1,2-bis(2-mercaptoethylthio) ethane, 1,3-bis(mercaptomethylthio) propane, 1,3-bis(2-mercaptoethylthio) propane, 1,2,3-tris(mercaptomethylthio) propane, 1,2,3-tris(2-mercaptoethylthio) propane, 1,2,3-tris(3-mercaptopropylthio) propane, 1,1,3,3-tetrakis(mercaptomethylthio) propane, 4,6-bis(mercaptomethylthio)-1,3-dithiane, 2-(2,2-bis(mercaptomethylthio) ethyl)-1,3-dithiethane, tetrakis(mercaptomethylthiomethyl) methane, tetrakis(2-mercaptoethylthiomethyl) methane, bis(2,3-dimercaptopropyl) sulfide, and the like, and at least one kind of these thiol compounds can be used.

In the present embodiment, as the thiol compounds (a1), at least one thiol compound selected from the group consisting of 4-mercaptomethyl-1,8-dimercapto-3,6-dithiaoctane, 4,8 or 4,7 or 5,7-dimercaptomethyl-1,11-dimercapto-3,6,9-trithiaundecane, bis(mercaptoethyl) sulfide, 2,5-bis(mercaptomethyl)-1,4-dithiane, 1,1,3,3-tetrakis(mercaptomethylthio) propane, 4,6-bis(mercaptomethylthio)-1,3-dithiane, and 2-(2,2-bis(mercaptomethylthio) ethyl)-1,3-dithiethane is preferably used.

The thiol compounds (a2) are compounds having one or more ester bonds and having two or more SH groups.

Specific examples of the thiol compounds (a2) include 2,3-dimercapto-1-propanol (3-mercaptopropionate), 3-mercapto-1,2-propanediol bis(2-mercaptoacetate), 3-mercapto-1,2-propanediol di(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), pentaerythritol bis(3-mercaptopropionate), pentaerythritol tris(3-mercaptopropionate), glycerin tris(2-mercaptoacetate), glycerin tris(3-mercaptopropionate), 1,4-cyclohexanediol bis(2-mercaptoacetate), 1,4-cyclohexanediol bis(3-mercaptopropionate), hydroxymethyl sulfide bis(2-mercaptoacetate), hydroxymethyl sulfide bis(3-mercaptopropionate), bis(2-mercaptoethyl ester) thioglycollate, bis(2-mercaptoethyl ester) thiodipropionic acid, hydroxyethyl sulfide (2-mercaptoacetate), hydroxyethyl sulfide (3-mercaptopropionate), thiol compounds represented by following General Formula (1), and the like.

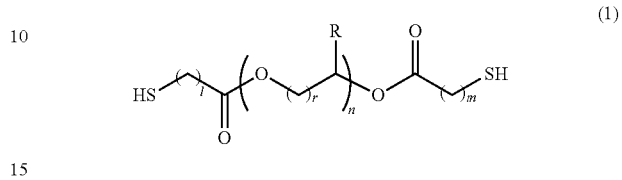

In the formula, 1, m, and r independently represent integers of 1 to 4, and n represents an integer of 1 to 3. R represents hydrogen or a methyl group, and, in a case in which multiple R's are present, R's may be identical to or different from each other. 1 and m independently represent integers of 1 or 2, r represents an integer of 1 to 3, and n represents 1 or 2.

The thiol compounds represented by General Formula (1) are condensates of one compound selected from ethylene glycol, diethylene glycol, triethylene glycol, and propylene glycol with mercaptoalkyl carboxylate, and specific examples thereof include ethylene glycol bis(mercaptoacetate), ethylene glycol bis(mercaptopropionate), ethylene glycol bis(mercaptobutyrate), diethylene glycol bis(mercaptoacetate), diethylene glycol bis(mercaptopropionate), diethylene glycol bis(mercapto butyrate), triethylene glycol bis(mercaptoacetate), triethylene glycol bis(mercaptopropionate), triethylene glycol bis(mercapto butyrate), bis(3-mercaptopropionic acid) 1,4-butanediol, and the like. Among these thiol compounds, one thiol compound or a combination of two or more thiol compounds can be used.

As the thiol compounds represented by General Formula (1), diethylene glycol bis(mercaptopropionate) or bis(3-mercaptopropionic acid) 1,4-butanediol can be preferably used.

The thiol compounds (a2) are preferably at least one kind selected from the group consisting of pentaerythritol tetrakis(2-mercaptoacetate), pentaerythritol tetrakis(3-mercaptopropionate), and thiol compounds represented by General Formula (1).

In the present embodiment, as the thiol compounds (a2), more preferably, it is possible to use pentaerythritol tetrakis(3-mercaptopropionate), diethylene glycol bis(mercaptopropionate), and bis(3-mercaptopropionic acid) 1,4-butanediol.

The thiol compounds (a3) are compounds having one or more ester bonds and one or more sulfide bonds and having two or more SH groups.

Specific examples of the thiol compounds (a3) include 2,2'-thiodiethanol bis(2-mercaptoacetate), 2,2'-thiodiethanol bis(3-mercaptopropionate), thiodimethanol bis(2-mercaptoacetate), thiodimethanol bis(3-mercaptopropionate), and the like. Among these thiol compounds, one thiol compound or a combination of two or more thiol compounds can be used.

[Imidazole-based Curing Catalyst (B)]

The imidazole-based curing catalyst (B) is not particularly limited, it is possible to use a compound represented by following General Formula (2), and at least one kind of the compounds can be included.

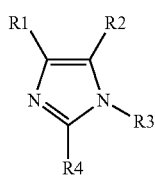

(2)

In the formula, each of R1, R2, R3, and R4 independently represents hydrogen, a mercapto group, a cyano group, an optionally substituted alkyl group, or an optionally substituted phenyl group, and R1, R2, R3, and R4 may be identical to or different from each other.

The optionally substituted alkyl group is a substituted or unsubstituted alkyl group having 1 to 12 carbon atoms.

Examples of a substituent for the substituted alkyl group having 1 to 12 carbon atoms include a hydroxyl group, a cyano group, a mercapto group, and the like. Examples of a substituent for the substituted phenyl group include a hydroxyl group, a cyano group, a mercapto group, and the like.

Specific examples of the imidazole-based curing catalyst (B) include 2-methylimidazole, 2-ethylimidazole, 2-ethyl-4-methylimidazole, 1-cyanoethyl-2-phenylimidazole, 1-cyanoethyl-2-phenyl imidazolium trimellitate, 2-phenylimidazole, 2-mercapto-1-methylimidazole, dimethylimidazole, N-benzylimidazole, 1-phenylimidazole, 1-(2-cyanoethyl)-2-ethyl-4-methylimidazole, 2-isopropylimidazole, 4-methylimidazole, benzylmethylimidazole, imidazole, and the like.

Preferred examples thereof include dimethylimidazole and benzylmethylimidazole. Among position isomers of dimethylimidazole and benzylmethylimidazole, 1,2-dimethylimidazole and 1-benzyl-2-methylimidazole can be considered as preferred examples thereof.

In the step a, it is also possible to further add "other components" described below to the mixed solution.

In the present step, a mixed solution including the thiol compounds (A) and the imidazole-based curing catalyst (B) is prepared. As the thiol compounds (A), it is possible to use a single thiol compound or a combination of two or more thiol compounds. A mixing method is not particularly limited, and a well-known method of the related art can be used.

Examples of the well-known method include a method in which a master batch including the imidazole-based curing catalyst (B) and the thiol compounds (A) is produced, and this master batch is dispersed and dissolved in the thiol compounds (A), thereby obtaining a mixed solution and the like.

The mixing temperature can be set to be 5° C. to 50° C. and preferably set to be 10° C. to 30° C. The addition order and the addition speed are not particularly limited as long as the respective components can be uniformly mixed together. From the above-described viewpoint, the mixing time can also be set to be 5 minutes to 60 minutes and preferably set to be 15 minutes to 30 minutes. The mixing pressure is not particularly limited, and the respective components can be mixed at normal pressure or under pressurization.

A mixed solution obtained in the above-described manner can be easily handled, and, when the mixed solution is used in the process of the present embodiment, the productivity of optical materials improves.

In the present embodiment, from the viewpoint of efficiently producing optical materials such as plastic lenses in which the occurrence rate of striae is low, and the generation of foreign material is suppressed, the amount of the imidazole-based curing catalyst (B) that can be used is 5 ppm or more, preferably 10 ppm or more, more preferably 50 ppm or more, and particularly preferably 100 ppm or more with respect to total amount of the thiol compounds (A) and an isocyanate compound (C) described below. Meanwhile, from the viewpoint of suppressing the generation of striae or foreign material in optical materials such as plastic lenses and, furthermore, workability such as pot life, the upper limit value thereof can be set to be 3,000 ppm or less, preferably set to be 2,000 ppm or less, and still more preferably set to be 1,000 ppm or less.

Regarding the amount of the imidazole-based curing catalyst (B) used, the above-described upper limit value and the above-described lower limit value can be appropriately combined together, and the amount thereof can be set to be 5 ppm to 3,000 ppm, preferably set to be 5 ppm to 2,000 ppm, still more preferably set to be 5 ppm to 1,000 ppm, more preferably set to be 50 ppm to 1,000 ppm, and particularly preferably set to be 100 ppm to 1,000 ppm. When the above-described amount of the imidazole-based curing catalyst (B) is included, it is possible to obtain plastic lenses in which the occurrence rate of striae is low and the generation of foreign material is effectively suppressed with favorable workability.

<Step b>

In the present step, a polymerizable composition for optical materials is prepared by mixing the mixed solution obtained in the step a and (C) an isocyanate compound including at least one kind of a di- or higher-functional alicyclic isocyanate compound (c1) and/or a di- or higher-functional aliphatic isocyanate compound (c2).

First, the respective components will be described.

[Isocyanate Compound (C)]

The isocyanate compound (C) includes a di- or higher-functional alicyclic isocyanate compound (c1) and/or a di- or higher-functional aliphatic isocyanate compound (c2).

Examples of the isocyanate compounds (C) include one or more compounds selected from compounds belonged to the alicyclic isocyanate compound (c1), one or more compounds selected from compounds belonged to the aliphatic isocyanate compound (c2), and combinations of one or more compounds selected from compounds belonged to the alicyclic isocyanate compound (c1) and one or more compounds selected from compounds belonged to the aliphatic isocyanate compound (c2).

As the isocyanate compounds (C), isocyanate compounds produced using either a natural product-derived (plant-derived) raw material or a fossil-derived raw material may be used.

Furthermore, the isocyanate compound (C) may be, in addition to a monomer, a modified product and/or a mixture of a monomer and a modified product, and examples of the modified product of isocyanate include multimers, biuret modified products, allophanate modified products, oxadiazinetrione modified products, polyol modified products, and the like. Examples of the multimers include dimers such as uretdione, urethoimine, and carbodiimide, and trimers and higher such as isocyanurate and imino-oxadiazinedione. Examples of the modified products of aliphatic polyisocyanate preferably include multimers of aliphatic polyisocyanate and more preferably include isocyanurate bodies of aliphatic polyisocyanate.

In the present embodiment, as the isocyanate compound (C), one or more selected from the alicyclic isocyanate compound (c1) and the aliphatic isocyanate (c2) are preferably used.

The di- or higher-functional alicyclic isocyanate compound (c1) is a compound having a cyclic skeleton other than an aromatic ring and two or more isocyanate groups. Specific examples of the alicyclic isocyanate compound (c1) include 1,3-bis(isocyanatomethyl)cyclohexane, 1,4-bis(isocyanatomethyl)cyclohexane, bis(4-isocyanato cyclohexyl) methane, bis(isocyanatomethyl)-bicyclo[2.2.1]heptane, isophorone diisocyanate, and the like, and at least one kind of these alicyclic isocyanate compounds can be used.

Meanwhile, bis(isocyanatomethyl)-bicyclo[2.2.1]heptane is a mixture of isomers containing 2,5-bis(isocyanatomethyl)-bicyclo[2.2.1]heptane and an isomer of 2,6-bis(isocyanatomethyl)-bicyclo[2.2.1]heptane. In the present embodiment, the compound comprised of a mixture of the isomers is used as one compound.

In the present embodiment, the alicyclic isocyanate compound (c1) is preferably bis(4-isocyanato cyclohexyl)methane or bis(isocyanatomethyl)-bicyclo[2.2.1]heptane, and at least one kind of these can be used.

The di- or higher-functional aliphatic isocyanate compound (c2) is a compound having an alkylene chain having 1 to 15 carbon atoms and two or more isocyanato groups.

Examples of the aliphatic isocyanate compound (c2) include trimethylene diisocyanate, tetramethylene diisocyanate, 1,5-pentamethylene diisocyanate, 1,6-hexamethylene diisocyanate, 2,2-dimethylpentane diisocyanate, 1,7-heptamethylene diisocyanate, 2,2,4-trimethylhexamethylene diisocyanate, 2,4,4-trimethylhexamethylene diisocyanate, lysine diisocyanate methyl ester, lysine triisocyanate, o-xylylene diisocyanate, m-xylylene diisocyanate, p-xylylene diisocyanate, α,α,α',α'-tetra methylxylylene diisocyanate, bis(isocyanate methyl) naphthalene, mesitylylene triisocyanate, bis(isocyanate methyl) sulfide, bis(isocyanate ethyl) sulfide, bis(isocyanate methyl) disulfide, bis(isocyanate ethyl) disulfide, bis(isocyanate methylthio) methane, bis (isocyanate ethylthio) methane, bis(isocyanate ethylthio) ethane, bis(isocyanate methylthio) ethane, dimer acid diisocyanate, octamethylene diisocyanate, decamethylene diisocyanate, bis(isocyanatoethyl) carbonate, bis(isocyanato ethyl) ether, 1,6,11-undeca triisocyanate, 1,3,6-hexamethylene triisocyanate, 1,8-diisocyanato-4-isocyanatomethyl octane, modified products of the above-described compounds, and the like, and at least one kind of these can be used.

In the present embodiment, the aliphatic isocyanate compound (c2) is preferably m-xylylene diisocyanate, 1,5-pentamethylene diisocyanate, 1,6-hexamethylene diisocyanate, 1,7-heptamethylene diisocyanate, lysine triisocyanate, lysine diisocyanate, dimer acid diisocyanate, octamethylene diisocyanate, decamethylene diisocyanate, or a modified product of the above-described compound, and at least one kind of these can be used.

In the step b, it is also possible to further add other components described below to the mixed solution.

[Other Components]

The polymerizable composition of the present embodiment optionally further include additives such as other active hydrogen compounds, an internal mold release agent, a resin modifier, alight stabilizer, a bluing agent, an ultraviolet absorber, an antioxidant, a coloration inhibitor, and a dye.

(Active Hydrogen Compounds)

In the present embodiment, the polymerizable composition may include active hydrogen compounds other than the thiol compounds (A) and the imidazole-based curing catalyst (B).

Examples of a thiol compound as the active hydrogen compound in the present embodiment include aliphatic thiol compounds, aromatic thiol compounds, and the like.

The aliphatic thiol compounds are compounds including neither sulfide bonds nor ester bonds, and examples thereof include methane dithiol, 1,2-ethanedithiol, 1,2-propanedithiol, 1,3-propanedithiol, 1,4-butanedithiol, 1,5-pentanedithiol, 1,6-hexanedithiol, 1,2-cyclohexanedithiol, 3,4-dimethoxybutane-1,2-dithiol, 2-methylcyclohexane-2,3-dithiol, 1,2-dimercaptopropyl methyl ether, 2,3-dimercaptopropyl methyl ether, bis(2-mercaptoethyl) ether, tetrakis(mercaptomethyl) methane, and the like.

Examples of the aromatic thiol compounds include 1,2-dimercapto benzene, 1,3-dimercapto benzene, 1,4-dimercapto benzene, 1,2-bis(mercaptomethyl) benzene, 1,4-bis(mercaptomethyl) benzene, 1,2-bis(mercaptoethyl) benzene, 1,4-bis(mercaptoethyl) benzene, 1,2,3-trimercapto benzene, 1,2,4-trimercapto benzene, 1,3,5-trimercapto benzene, 1,2,3-tris(mercaptomethyl) benzene, 1,2,4-tris(mercaptomethyl) benzene, 1,3,5-tris(mercaptomethyl) benzene, 1,2,3-tris(mercaptoethyl) benzene, 1,3,5-tris(mercaptoethyl) benzene, 1,2,4-tris(mercaptoethyl) benzene, 2,5-toluene dithiol, 3,4-toluene dithiol, 1,4-naphthalene dithiol, 1,5-naphthalene dithiol, 2,6-naphthalene dithiol, 2,7-naphthalene dithiol, 1,2,3,4-tetramercapto benzene, 1,2,3,5-tetramercapto benzene, 1,2,4,5 tetramercapto benzene, 1,2,3,4-tetrakis(mercaptomethyl) benzene, 1,2,3,5-tetrakis (mercaptomethyl) benzene, 1,2,4,5-tetrakis (mercaptomethyl) benzene, 1,2,3,4-tetrakis(mercaptoethyl) benzene, 1,2,3,5-tetrakis(mercaptoethyl) benzene, 1,2,4,5-tetrakis(mercaptoethyl) benzene, 2,2'-dimercaptobiphenyl, 4,4'-dimercaptobiphenyl, and the like.

(Internal Mold Release Agent)

The polymerizable composition in the present embodiment may include an internal mold release agent in order to improve mold release properties from molds after molding.

As the internal mold release agent, acidic phosphoric acid esters can be used. Examples of acidic phosphoric acid esters include phosphoric acid monoesters, phosphoric acid diesters, and the like, and each of the acidic phosphoric acid esters can be used singly or two or more acidic phosphoric acid esters can be used in a mixed form.

For example, ZELEC UN manufactured by Stepan Company, internal mold release agents for MR manufactured by Mitsui Chemicals, Inc., JP series manufactured by Johoku Chemical Co., Ltd., PHOSPHANOL manufactured by Toho Chemical Industry Co., Ltd., AP and DP series manufactured by Daihachi Chemical Industry Co., Ltd., and the like can be used.

(Resin Modifier)

In addition, in the polymerizable composition in the present embodiment, it is possible to add a resin modifier in order to adjust a variety of properties of resins to be obtained such as optical properties, impact resistance, and specific weight and to adjust the viscosity and pot life of the composition as long as the effects of the present embodiment are not impaired.

Examples of the resin modifier include episulfide compounds, alcohol compounds, amine compounds, epoxy compounds, organic acids and anhydrides thereof, olefin compounds containing (meth)acrylate compounds, and the like.

(Light Stabilizer)

As the light stabilizer, hindered amine-based compounds can be used. Examples of commercially available products of hindered amine-based compounds include LOWILITE 76 and LOWILITE 92 manufactured by Chemtura Corporation, TINUVIN 144, TINUVIN 292, and TINUVIN 765 manufactured by BASF, ADEKASTAB LA-52 and LA-72 manufactured by ADEKA Corporation, JF-95 manufactured by Johoku Chemical Co., Ltd., and the like.

(Bluing Agent)

Examples of the bluing agent include bluing agents which have an absorption band in a wavelength range from orange color to yellow color in the visible light range and have a function of adjusting the color of optical materials comprised of a resin. More specific examples of the bluing agent include substances exhibiting blue color through violet color.

(Ultraviolet Absorber)

Examples of the ultraviolet absorber include benzophenone-based ultraviolet absorbers such as 2,2'-dihydroxy-4-methoxybenzophenone, 2-hydroxy-4-acryloyloxy benzophenone, 2-hydroxy-4-acryloyloxy-5-tert-butylbenzophenone, 2-hydroxy-4-acryloyloxy-2',4'-dichloro benzophenone, triazine-based ultraviolet absorbers such as 2-[4-[(2-hydroxy-3-dodecyloxypropyl)oxy]-2-hydroxyphenyl]4,6-bis (2,4-dimethylphenyl)-1,3,5-triazine, 2-[4-[(2-hydroxy-3-tridecyloxypropyl)oxy]-2-hydroxyphenyl]-4,6-b is(2,4-dimethylphenyl)-1,3,5-triazine, 2-[4-[(2-hydroxy-3-(2'-ethyl)hexyl)oxy]-2-hydroxyphenyl]-4,6-bis (2,4-dimethylphenyl)-1,3,5-triazine, 2,4-bis(2-hydroxy-4-butyloxyphenyl)-6-(2,4-bis-butyloxyphenyl)-1,3,5-triazine, and 2-(2-hydroxy-4-[1-octyloxy carbonyl ethoxy] phenyl)-4,6-bis(4-phenylphenyl)-1,3,5-triazines, and benzotriazole-based ultraviolet absorbers such as 2-(2H-benzotriazol-2-yl)-4-methylphenol, 2-(2H-benzotriazol-2-yl)-4-tert-octylphenol, 2-(2H-benzotriazol-2-yl)-4,6-bis(1-methyl-1-phenylethyl) phenol, 2-(2H-benzotriazol-2-yl)-4,6-di-tert-pentylphenol, 2-(5-chloro-2H-benzotriazol-2-yl)-4-methyl-6-tert-butyl-phenol, 2-(5-chloro-2H-benzotriazol-2-yl)-2,4-tert-butyl-phenol, and 2,2'-methylenebis[6-(2H-benzotriazol-2-yl)-4-(1,1,3,3-tetramethy lbutyl) phenol], and preferred examples thereof include benzotriazole-based ultraviolet absorbers such as 2-(2H-benzotriazole-2-yl)-4-tert-octylphenol and 2-(5-chloro-2H-benzotriazol-2-yl)-4-methyl-6-tert-butyl-phenol. These ultraviolet absorbers may be used singly, or two or more ultraviolet absorbers may be jointly used.

In the step b, the isocyanate compound (C) can be used so that the molar ratio of mercapto groups in the thiol compounds (A) to isocyanate groups in the isocyanate compound (C) falls in a range of 0.8 to 1.2, preferably falls in a range of 0.85 to 1.15, and more preferably falls in a range of 0.9 to 1.1. When the above-described molar ratio is within the above-described range, it is possible to obtain resins that are preferably used as optical materials, particularly, materials of plastic lens for eyeglass.

In the step b, a polymerizable composition is prepared by mixing the isocyanate compound (C), the mixed solution obtained in the step a, furthermore, the internal mold release agent and other additives as necessary. The solution temperature during mixing is generally 25° C. or lower. From the viewpoint of the pot life of the polymerizable composition, the solution temperature is preferably set to a lower temperature. However, in a case in which the solubility of the internal mold release agent and the additives in monomers is not favorable, it is also possible to heat the internal mold release agent and the additives in advance and thus dissolve the internal mold release agent and the additives in monomers and the resin modifier.

In the present embodiment, a mixed solution including the imidazole-based curing catalyst (B) and the thiol compounds (A) is prepared, and, in the step b, the mixed solution obtained in the step a and the isocyanate compound (C) are mixed with each other, thereby preparing a polymerizable composition for optical materials. Therefore, the adverse effects of the imidazole-based catalyst on polymerizable compounds and polymerizable compositions are suppressed, and consequently, it is possible to manufacture high-quality plastic lenses in which the occurrence rate of striae is low and the generation of foreign material is effectively suppressed.

<Step c>

In the present step, the polymerizable composition for optical materials obtained in the step b is injected into a mold.

For example, the polymerizable composition is injected into a shaping mold (mold) held using a gasket, tape, or the like. At this time, there are many cases in which a filtration treatment and the like such as a degassing treatment under reduced pressure, filtration treatment under pressurization or depressurization are preferably carried out as necessary depending on properties necessary for optical materials to be obtained such as plastic lenses.

The injection of the polymerizable composition for optical materials into the mold can be carried out using a well-known method of the related art, and, for example, the polymerizable composition can be injected thereinto manually or using a mixing and injection device.

As the mold in the present embodiment, a variety of molds can be used as long as the molds are intended to prepare optical materials, and there is no particular limitation.

<Step d>

In the present step, the polymerizable composition for optical materials injected into the mold in the step c is polymerization-cured.

Polymerization conditions are not limited since the conditions significantly vary depending on the composition of the polymerizable composition, the kind and used amount of the catalyst, the shape of the mold, and the like, but the polymerization is carried out at a temperature in a range of approximately −50° C. to 150° C. for one hour to 50 hours. In some cases, it is preferable to cure the polymerizable composition for one hour to 25 hours after holding or slowly heating the polymerizable composition in a temperature range of 10° C. to 150° C.

The optical material comprised of a thiourethane resin in the present embodiment may be subjected to a treatment such annealing as necessary. The treatment temperature is generally in a range of 50° C. to 150° C., preferably in a range of 90° C. to 140° C., and more preferably in a range of 100° C. to 130° C.

In the present embodiment, when the optical material comprised of a thiourethane resin is shaped, a variety of additives such as a chain extender, a crosslinking agent, an oil-soluble dye, a filler, and an adhesive improver may be added thereto depending on the purposes as in well-known shaping methods in addition to the above-described "other components".

In a case in which a plastic eyeglass lens is produced using the process for producing the optical material of the present embodiment, in the step d, a substantially disc-like lens base material is prepared.

Furthermore, in a case in which a plastic eyeglass lens is produced, it is possible to include a step of forming a coating layer over at least one surface of the lens base material.

Specific examples of the coating layer include a primer layer, a hard coat layer, an antireflection layer, an antifogging coating layer, an antifouling layer, and a water-repellent layer. Each of these coating layers may be used singly, or a plurality of the coating layers may be used in a multilayer form. In a case in which the coating layers are provided over both surfaces, the same coating layers or different coating layers may be provided over the respective layers.

A plastic eyeglass lens of the present embodiment can be obtained by a process including a step of sequentially forming a primer layer, a hard coat layer, and an antireflection layer over at least one surface of a lens base material comprised of the above-described optical material, and it is also possible to further form other layers.

With these coating layers, an ultraviolet absorber for the purpose of protecting the lens or eyes from ultraviolet rays, an infrared absorber for the purpose of protecting eyes from infrared rays, a light stabilizer or an antioxidant for the purpose of improving the weather resistance of the lens, dyes or pigments and, furthermore, photochromic dyes or photochromic pigments for the purpose of enhancing the fashion properties of the lens, an antistatic agent, and, additionally, well-known additives for enhancing the performances of the lens may be jointly used. For layers coated by means of coating, a variety of levelling agents intended to improve coating properties may be used.

The primer layer is generally formed between a hard coat layer described below and a lens. The primer layer is a coating layer intended to improve adhesiveness to the hard coat layer and the lens which are formed on the primer layer and, in some cases, is also capable of improving impact resistance. Any material can be used for the primary layer as long as the material is highly adhesive to the obtained lens; however, generally, primer compositions including a urethane-based resin, an epoxy-based resin, a polyester-based resin, a melamine-based resin, and polyvinyl acetal as main components and the like are used. In the primer composition, an appropriate solvent having no influences on the lens may be used in order to adjust the viscosity of the composition. It is needless to say that no solvents may be used.

The primer layer can also be formed using any one of a coating method and a dry method. In a case in which a coating method is used, the primary layer is formed by applying a primer composition onto a lens using a well-known coating method such as spin coating or dip coating and then solidifying the primer composition. In a case in which a dry method is used, the primary layer is formed using a well-known dry method such as a CVD method or a vacuum deposition method. During the formation of the primer layer, the surface of the lens may be subjected to a pretreatment such as an alkali treatment, a plasma treatment, or an ultraviolet treatment as necessary in order to improve adhesiveness.

The hard coat layer is a coating layer intended to impart functions such as abrasion resistance, wear resistance, moisture resistance, hot water resistance, heat resistance, and weather resistance to the lens surface.

For the hard coat layer, generally, a hard coat composition including one or more kinds of fine particles constituted of a complex oxide of a curable organic silicon compound and one or more kinds of oxide fine particles of an element selected from an element group of Si, Al, Sn, Sb, Ta, Ce, La, Fe, Zn, W, Zr, In, and Ti and/or two or more kinds of elements selected from the above-described element group is used.

The hard coat composition preferably includes, in addition to the above-described components, at least any of amines, amino acids, metallic acetylacetonate complex, organic acid metallic salts, perchloric acids, salts of perchloric acids, acids, metal chlorides, and polyfunctional epoxy compounds. In the hard coat composition, an appropriate solvent having no influences on the lens may be used, and the hard coat composition may include no solvents.

The hard coat layer is generally formed by applying the hard coat composition using a well-known coating method such as spin coating or dip coating and then curing the hard coat composition. Examples of a curing method include curing methods in which the hard coat composition is cured by means of thermal curing or irradiation with energy rays such as ultraviolet rays or visible light rays. In order to suppress the generation of interference stripes, the refractive index of the hard coat layer is preferably in a range of ±0.1 from the refractive index of the lens.

Generally, the antireflection layer is formed over the hard coat layer as necessary. Antireflection layers are classified into inorganic antireflection layers and organic antireflection layers, and, in a case in which the antireflection layer is an inorganic antireflection layer, the antireflection layer is formed using an inorganic oxide such as $SiO_2$ or $TiO_2$ and a dry method such as a vacuum deposition method, a sputtering method, an ion plating method, an ion beam assist method, or a CVD method. In a case in which the antireflection layer is an organic antireflection layer, the antireflection layer is formed using a composition including an organic silicon compound and silica-based fine particles having internal voids and a wet method.

The antireflection layer may have a single layer structure or a multilayer structure, and, in a case in which a single layer-structured antireflection layer is used, the refractive index of the antireflection layer is preferably lower than the refractive index of the hard coat layer by at least 0.1 or more. In order to effectively develop an antireflection function, a multilayered antireflection film is preferably formed, and, in this case, low-refractive index films and high-refractive index films are alternately laminated. In this case as well, the difference in the refractive index between the low-refractive index film and the high-refractive index film is preferably 0.1 or more. Examples of the high-refractive index films include films of ZnO, $TiO_2$, $CeO_2$, $Sb_2O_5$, $SnO_2$, $ZrO_2$, and $Ta_2O_5$, and examples of the low-refractive index films include $SiO_2$ films and the like.

Over the antireflection layer, an antifogging coating layer, an antifouling layer, and a water-repellent layer may be formed as necessary. Regarding methods for forming the antifogging coating layer, the antifouling layer, and the water-repellent layer, treatment methods, treatment materials, and the like are not particularly limited as long as there are no adverse effects on the antireflection function, and well-known antifogging treatment methods, antifouling treatment methods, and water-repellent treatment methods, and materials can be used. Examples of antifogging treatment methods and antifouling treatment methods include a method in which the surface is covered with a surfactant, a method in which a hydrophilic film is attached to the surface so as to impart water-absorbing properties, a method in which the surface is covered with fine protrusion and recesses so as to enhance water-absorbing properties, a method in which water-absorbing properties are imparted using a photocatalytic activity, a method in which a superhydrophobic treatment is carried out so as to prevent the attachment of water droplets, and the like. In addition, examples of the water-repellent treatment include a method in which a water-repellent treatment layer is formed by depositing or sputtering a fluorine-containing silane compound or the like, a method in which a fluorine-containing silane compound is dissolved in a solvent and then is applied, thereby forming a water-repellent treatment layer, and the like.

The plastic eyeglass lens of the present embodiment in which a thiourethane resin is used may be dyed using appropriate colorants in order to impart fashion properties or photochromic properties. The lens can be dyed using a well-known dyeing method and is generally dyed using the following method.

Generally, a lens material finished to a predetermined optical surface is immersed in a dyeing fluid in which a colorant being used is dissolved or uniformly dispersed (dyeing step), and then the colorant is fixed by heating the lens as necessary (post-dyeing annealing step). Colorants that are used in the dyeing step are not particularly limited as long as the colorants are well-known colorants; however, generally, oil-soluble dyes or dispersive dyes are used. The solvent that is used in the dyeing step is not particularly limited as long as the solvent is capable of dissolving or uniformly dispersing colorants being used. In this dyeing step, a surfactant for dispersing the colorants in the dyeing fluid or a carrier for accelerating dyeing may be added as necessary. In the dyeing step, colorants and a surfactant which is added as necessary, are dispersed in water or a mixture of water and an organic solvent so as to prepare a dyeing bath, an optical lens is immersed in this dyeing bath, and dyeing is carried out at a predetermined temperature for a predetermined time. The dyeing temperature and the dyeing time vary depending on desire coloration densities; however, generally, the dyeing temperature and the dyeing time are preferably 120° C. or lower and approximately several minutes to several tens of hours, and the dyeing density of the dyeing bath is in a range of 0.01% by weight to 10% by weight. In addition, in a case in which dyeing is difficult, the lens may be dyed under pressurization. The post-dyeing annealing step which is carried out as necessary is a step in which a heating treatment is carried out on the dyed lens material. In the heating treatment, water remaining on the surface of the lens material dyed in the dyeing step is removed using a solvent or the like or the solvent is dried with wind, and then the lens material is retained in, for example, a furnace such as an infrared heating furnace in the atmosphere or a resistance heating furnace for a predetermined time. The post-dyeing annealing step prevents the discoloration of the dyed lens material (discoloration prevention step) and removes moisture that has intruded into the lens material during dyeing.

<Uses>

Optical materials comprised of a thiourethane resin which are obtained by the process of the present embodiment can be provided with a variety of shapes by changing the kinds of the mold used during cast molding polymerization.

An optical material of the present embodiment has a high refractive index and high transparency and can be used in a variety of uses such as plastic lenses, camera lenses, light-emitting diodes (LED), prisms, optical fibers, information-recording substrates, and filters. Particularly, the optical material is preferable for optical materials and optical elements such as plastic lenses, camera lenses, and light-emitting diodes.

Examples of plastic lenses include plastic eyeglass lenses comprised of a polythiourethane resin which are obtained by the above-described process and plastic polarizing lenses in which layers comprised of a polythiourethane resin are laminated on at least one surface of a polarizing film. A process for producing a plastic polarizing lens will be described below.

A process for producing an optical material of the present invention can also be described using a process for producing a plastic polarizing lens as described below. Meanwhile, description of identical steps will not be repeated.

<Process for Producing Plastic Polarizing Lens>

A process for producing a plastic polarizing lens of the present embodiment includes the following steps.

Step i: A polarizing film is fixed to the inside of a mold for lens casting in a state in which at least one surface of the polarizing film is separated from the mold.

Step ii: A mixed solution of (A) di- or higher-functional thiol compounds having one or more sulfide bonds and/or one or more ester bonds and (B) an imidazole-based curing catalyst is prepared.

Step iii: (C) an isocyanate compound including at least one kind of a di- or higher-functional alicyclic isocyanate compound (c1) and/or a di- or higher-functional aliphatic isocyanate compound (c2) is mixed with the mixed solution to prepare a polymerizable composition for optical materials.

Step iv: The polymerizable composition for optical materials is injected into a space between the polarizing film and the mold.

Step v: the polymerizable composition for optical materials is polymerization-cured to laminate a layer comprised of a polythiourethane resin over at least one surface of the polarizing film.

Hereinafter, the respective steps will be sequentially described.

[Step i]

A polarizing film is fixed to the inside of a mold for lens casting so that at least one kind of the film surfaces becomes parallel to the facing mold inner surface.

The mold for lens casting is generally a mold constituted of two substantially disc-like molds that are held using a gasket. The polarizing film is installed in the space of the mold for lens casting so that the film surface becomes parallel to the mold inner surface on the facing front side. A space portion is formed between the polarizing film and the mold. Meanwhile, the polarizing film may be shaped in advance.

As the polarizing film, a variety of polarizing films such as polyvinyl alcohol polarizing films and thermoplastic polyester polarizing films can be used. Examples of thermoplastic polyester include polyethylene terephthalate, polyethylene naphthalate, polybutylene terephthalate, and the like.

Specific examples of the polarizing film include dichroic dye-containing thermoplastic polyester polarizing films, iodine-containing polyvinyl alcohol polarizing films, dichroic dye-containing polyvinyl alcohol polarizing films, and the like.

[Step ii, Step iii]

The step ii and the step iii can be carried out in the same manner as the respective steps of the step a and the step b in the above-described process for producing an optical material.

[Step iv]

In the present step, the polymerizable composition for optical materials is injected into a space between the polarizing film and the mold. An injection method in the step iv can be carried out in the same manner as in the step c in the above-described process for producing an optical material.

[Step v]

In addition, the step v can be carried out in the same manner as in the step d in the above-described process for producing an optical material.

The plastic polarizing lens can be obtained by the above-described process.

Hitherto, the embodiment of the present invention has been described, but the embodiment is an example of the present invention, and a variety of other constitutions can be employed as long as the effects of the present invention are not impaired.

EXAMPLES

Hereinafter, the present invention will be described in more detail using examples, but the present invention is not limited thereto. In the following description, unless particularly otherwise described, "parts" and "%" are mass-based units.

(Method for measuring the concentration (%) of unreacted 1,5-pentamethylene diisocyanate in polyisocyanate (I) which is a composition including a modified product of 1,5-pentamethylene diisocyanate)

Using a following device, the concentration of unreacted 1,5-pentamethylene diisocyanate in polyisocyanate (I) including a modified product was obtained from standard curves produced using 1,5-pentamethylene diisocyanate as a standard product.

Device: Prominence (manufactured by Shimadzu Corporation)
Column: SHISEIDO SILICA SG-120
Column temperature: 40° C.
Eluent: n-Hexane/methanol/1,2-dichloroethane=90/5/5 (volume ratio)
Flow rate: 0.2 ml/min
Detector: UV 225 nm
R. Time: 16.9 min Preparation of measurement solution: A specimen (0.1 g) and dibenzyl amine amounting to approximately 20 times the mole of the specimen were added to a 50 ml measuring flask, and the mass was increased using 1, 2-dichloroethane, thereby preparing a measurement solution.

Measurement: The measurement solution (1 μL) was injected, and the concentration was measured.

(Method for measuring the concentration (%) of isocyanate groups in polyisocyanate (I))

The concentration was measured by using a potentiometric titration device according to an n-dibutylamine method based on JIS K-1556.

(Method for measuring the concentration (%) of isocyanurate monocaryons in polyisocyanate (I))

Using a following device, the area ratio of a peak corresponding to a molecular weight three times the molecular weight of 1, 5-pentamethylene diisocyanate to the entire peak area was obtained as the concentration (%) of isocyanurate monocaryons in polyisocyanate (I) from chromatograms obtained by means of gel permeation chromatography.

Device: HLC-8020 (manufactured by Tosoh Corporation)
Column: Direct connection of G1000HXL, G2000HXL, and G3000HXL (manufactured by Tosoh Corporation)
Column temperature: 40° C.
Eluent: Tetrahydrofuran
Flow rate: 0.8 ml/min
Detector: Refractive index detector
R. Time: Isocyanurate monocaryon, 27.2 min
Standard substance: Polyethylene oxide (manufactured by Tosoh Corporation, TSK standard polyethylene oxide)
Measurement: The specimen (30 mg) was dissolved in tetrahydrofuran (10 ml), the obtained solution (100 μL) was injected, and the concentration was measured.

(Method for calculating the average number of functional groups in polyisocyanate (I))

The average number of functional groups in polyisocyanate (I) was calculated from the following equation using the number-average molecular weight, which is obtained by the same measurement method as for the concentration of isocyanurate monocaryons in polyisocyanate (I), and the concentration of isocyanate groups in polyisocyanate (I).

(The average number of functional groups in polyisocyanate (I)=(the number-average molecular weight of polyisocyanate (I))×(the concentration (%) of isocyanate groups in polyisocyanate (I)) 4202

Synthesis Example 1

(Synthesis of 1,5-pentamethylene diisocyanate modified product (preparation of polvisocvanate (I)))

1,5-Pentamethylene diisocyanate (500 parts), isobutyl alcohol (1 part), 2,6-di(tert-butyl)-4-methyl phenol (0.3 parts), and tris(tridecyl)phosphite (manufactured by Johoku chemical Co., Ltd., trade name: JP-333E) (0.3 parts) were loaded into a four-neck flask equipped with a stirrer, a thermometer, a reflux tube, and a nitrogen introduction tube and were reacted together at 80° C. for two hours. Next, N-(2-hydroxypropyl)-N,N,N-trimethylammonium-2-ethylhexanoate (manufactured by Air Products Japan, Inc. trade name: DABCO(R)TMR) (0.05 parts) were added thereto as a trimerization catalyst. After a 50-minute reaction, o-toluenesulfonamide (hereinafter, in some cases, abbreviated as OTS) (0.12 parts) was added thereto. The obtained reaction solution was distilled at a degree of vacuum of 0.09 KPa and a temperature of 150° C. by being passed through a thin film distillation device, thereby obtaining unreacted pentamethylene diisocyanate (401 parts). Furthermore, o-toluenesulfonamide (0.02 parts) was added to the obtained composition (100 parts), thereby obtaining polyisocyanate (I) (100 parts) which is a composition including a modified product of 1,5-pentamethylene diisocyanate. The amount derived from 1,5-pentamethylene diisocyanate constituting this modified product was 98% by weight.

The polyisocyanate (I) has a concentration of unreacted 1,5-pentamethylene diisocyanate of lower than 1% by weight, a concentration of isocyanurate monocaryons of 65% by weight, a number-average molecular weight of 554.7, a concentration of isocyanate groups of 25%, and the average number of functional groups of 3.3.

A performance test was carried out, and thus a resin molded product obtained by means of polymerization was evaluated. Regarding the performance test, the refractive index, the Abbe number, the heat resistance, the specific weight, the generation of foreign material, and the generation of striae were evaluated using the following test methods.

Refractive index (ne) and Abbe number (υe): The refractive index and the Abbe number were measured at 20° C. using a Pulfrich refractometer KPR-30 manufactured by Shimadzu Corporation.

Heat resistance: The glass transition temperature (Tg) in a TMA penetration method (with a load of 50 g and a pin tip diameter of 0.5 mmφ) was measured as the heat resistance using TMA-60 manufactured by Shimadzu Corporation.

Foreign material in the resin molded product: A produced lens was visually observed using a light source of a slide projector (manufactured by Cabin Co., Ltd., CS-15), and whether or not foreign material was observed on the resin molded product was evaluated.

Striae: Ten produced resin molded products were visually observed using a light source of a high-pressure mercury (manufactured by Ushio Inc.), when the number of resin molded products on which striae were not observed was eight to ten, the generation of striae was evaluated as O, when the number thereof was six or seven, the generation of striae was evaluated as Δ, and, when the number thereof was five or smaller, the generation of striae was evaluated as X.

Example 1

ZELEC UN (acidic phosphoric acid ester: registered trademark, manufactured by Stepan Company) (0.24 parts), VISORB 583 (ultraviolet absorber: registered trademark, manufactured by Kyodo Chemical Co., Ltd.) (3.0 parts), and 1,5-pentamethylene diisocyanate (48.3 parts) were mixed together, the components were stirred and dissolved at room temperature for 15 minutes, and then "polyisocyanate (I) including an isocyanurate product of 1,5-pentamethylene diisocyanate" (56.3 parts) was mixed into the mixture, thereby preparing a polyisocyanate solution. Meanwhile, "a polythiol including 4,8 and 4,7 and 5,7-dimercaptomethyl-1,11-dimercapto-3,6,9-trithiaundecane as a main component" (66.1 parts), pentaerythritol tetrakis(3-mercaptopropionate) (29.4 parts), and 1-benzyl-2-methylimidazole (0.06 parts) were mixed together, and the components were stirred and dissolved at room temperature for 30 minutes, thereby preparing a polythiol solution. The polyisocyanate solution and the polythiol solution were mixed together in the full amount, and the components were stirred and mixed together at room temperature, thereby obtaining a homogeneous solution of a monomer mixture. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product did not have any observable foreign material, had a colorless and transparent appearance, and had a refractive index (ne) of 1.60, an Abbe number (υe) of 38, and heat resistance at 85° C. Out of ten obtained resin molded products, the number of resin molded products on which striae were not observed was ten, and thus the generation of striae was evaluated as O.

Example 2

ZELEC UN (acidic phosphoric acid ester: registered trademark, manufactured by Stepan Company) (0.1 parts), VISORB 583 (ultraviolet absorber: registered trademark, manufactured by Kyodo Chemical Co., Ltd.) (1.5 parts), and 2,5 (6)-bis(isocyanatomethyl)-bicyclo[2.2.1]heptane (50.6 parts) were mixed together, the components were stirred and dissolved at room temperature for 15 minutes, thereby preparing a polyisocyanate solution. Meanwhile, pentaerythritol tetrakis (3-mercaptopropionate) (23.9 parts), 4-mercaptomethyl-1,8-dimercapto-3,6-dithiaoctane (25.5 parts) and 1-benzyl-2-methylimidazole (0.03 parts) were mixed together, and the components were stirred and dissolved at room temperature for 30 minutes, thereby preparing a polythiol solution. The polyisocyanate solution and the polythiol solution were mixed together in the full amount, and the components were stirred and mixed together at room temperature, thereby obtaining a homogeneous solution of a monomer mixture. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product did not have any observable foreign material, had a colorless and transparent appearance, and had a refractive index (ne) of 1.60, an Abbe number (υe) of 39, and heat resistance at 112° C. Out of ten obtained resin molded products, the number of resin molded products on which striae were not observed was nine, and thus the generation of striae was evaluated as O.

Example 3

ZELEC UN (acidic phosphoric acid ester: registered trademark, manufactured by Stepan Company) (0.1 parts), VISORB 583 (ultraviolet absorber: registered trademark, manufactured by Kyodo Chemical Co., Ltd.) (1.5 parts), and m-xylylene diisocyanate (52.0 parts) were mixed together, the components were stirred and dissolved at room temperature for 15 minutes, thereby preparing a polyisocyanate solution. Meanwhile, 4-mercaptomethyl-1,8-dimercapto-3,6-dithiaoctane (48.0 parts) and 1-benzyl-2-methylimidazole (0.03 parts) were mixed together, and the components were stirred and dissolved at room temperature for 30 minutes, thereby preparing a polythiol solution. The polyisocyanate solution and the polythiol solution were mixed together in the full amount, and the components were stirred and mixed together at room temperature, thereby obtaining a homogeneous solution of a monomer mixture. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product did not have any observable foreign material, had a colorless and transparent appearance, and had a refractive index (ne) of 1.67, an Abbe number (υe) of 31, and heat resistance at 85° C. Out of ten obtained resin molded products, the number of resin molded products on which striae were not observed was eight, and thus the generation of striae was evaluated as O.

Example 4

ZELEC UN (acidic phosphoric acid ester: registered trademark, manufactured by Stepan Company) (0.1 parts), VISORB 583 (ultraviolet absorber: registered trademark, manufactured by Kyodo Chemical Co., Ltd.) (1.5 parts), and m-xylylene diisocyanate (50.6 parts) were mixed together, the components were stirred and dissolved at room temperature for 15 minutes, thereby preparing a polyisocyanate solution. Meanwhile, "a polythiol including 4,8 and 4,7 and 5,7-dimercaptomethyl-1,11-dimercapto-3,6,9-trithiaundecane as a main component" (49.4 parts) and 1-benzyl-2-methylimidazole (0.03 parts) were mixed together, and the components were stirred and dissolved at room temperature for 30 minutes, thereby preparing a polythiol solution. The polyisocyanate solution and the polythiol solution were mixed together in the full amount, and the components were stirred and mixed together at room temperature, thereby obtaining a homogeneous solution of a monomer mixture. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product did not have any observable foreign material, had a colorless and transparent appearance, and had a refractive index (ne) of 1.67, an Abbe number (νe) of 31, and heat resistance at 98° C. Out of ten obtained resin molded products, the number of resin molded products on which striae were not observed was nine, and thus the generation of striae was evaluated as O.

Example 5

ZELEC UN (acidic phosphoric acid ester: registered trademark, manufactured by Stepan Company) (0.1 parts), VIOSORB 583 (ultraviolet absorber: registered trademark, manufactured by Kyodo Chemical Co., Ltd.) (1.5 parts), and 2, 5 (6)-bis(isocyanatomethyl)-bicyclo[2.2.1]heptane (49.7 parts) were mixed together, the components were stirred and dissolved at room temperature for 15 minutes, thereby preparing a polyisocyanate solution. Meanwhile, pentaerythritol tetrakis(3-mercaptopropionate) (24.4 parts), "a polythiol including 4,8 and 4,7 and 5,7-dimercaptomethyl-1,11-dimercapto-3,6,9-trithiaundecane as a main component" (25.9 parts), and 1-benzyl-2-methylimidazole (0.03 parts) were mixed together, and the components were stirred and dissolved at room temperature for 30 minutes, thereby preparing a polythiol solution. The polyisocyanate solution and the polythiol solution were mixed together in the full amount, and the components were stirred and mixed together at room temperature, thereby obtaining a homogeneous solution of a monomer mixture. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product did not have any observable foreign material, had a colorless and transparent appearance, and had a refractive index (ne) of 1.60, an Abbe number (νe) of 39, and heat resistance at 121° C. Out of ten obtained resin molded products, the number of resin molded products on which striae were not observed was nine, and thus the generation of striae was evaluated as O.

Comparative Example 1

ZELEC UN (acidic phosphoric acid ester: registered trademark, manufactured by Stepan Company) (0.24 parts), VIOSORB 583 (ultraviolet absorber: registered trademark, manufactured by Kyodo Chemical Co., Ltd.) (3.0 parts), 1-benzyl-2-methylimidazole (0.06 parts), and 1,5-pentamethylene diisocyanate (48.3 parts) were mixed together, the components were stirred and dissolved at room temperature for 15 minutes, and then "polyisocyanate (I) including an isocyanurate product of 1,5-pentamethylene diisocyanate" (56.3 parts) was mixed into the mixture, thereby preparing a polyisocyanate solution. During the preparation of this polyisocyanate solution, the generation of foams was confirmed. "A polythiol including 4,8 and 4,7 and 5,7-dimercaptomethyl-1,11-dimercapto-3,6,9-trithiaundecane as a main component" (66.1 parts) and pentaerythritol tetrakis(3-mercaptopropionate) (29.4 parts) were added to this polyisocyanate solution, and the components were stirred and mixed together at room temperature, thereby obtaining a homogeneous solution of a monomer mixture. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.60, an Abbe number (νe) of 38, and heat resistance at 85° C. There were some resin molded products on which striae and foreign material were slightly observed. Out of ten obtained resin molded products, the number of resin molded products on which striae were not observed was four, and thus the generation of striae was evaluated as X.

Comparative Example 2

ZELEC UN (acidic phosphoric acid ester: registered trademark, manufactured by Stepan Company) (0.24 parts), VIOSORB 583 (ultraviolet absorber: registered trademark, manufactured by Kyodo Chemical Co., Ltd.) (3.0 parts), and 1,5-pentamethylene diisocyanate (48.3 parts) were mixed together, the components were stirred and dissolved at room temperature for 15 minutes, and then "polyisocyanate (I) including an isocyanurate product of 1,5-pentamethylene diisocyanate" (56.3 parts) was mixed into the mixture, thereby preparing a polyisocyanate solution. "A polythiol including 4,8 and 4,7 and 5, 7-dimercaptomethyl-1,11-dimercapto-3,6,9-trithiaundecane as a main component" (66.1 parts), pentaerythritol tetrakis(3-mercaptopropionate) (29.4 parts), and 1-benzyl-2-methylimidazole (0.06 parts) were added to this polyisocyanate solution, and the components were stirred and mixed together at room temperature, thereby obtaining a homogeneous solution of a monomer mixture. During the preparation of the homogeneous solution, the generation of heat was confirmed. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.60, an Abbe number (υe) of 38, and heat resistance at 85° C. There were some resin molded products on which striae and foreign material were slightly observed. Out of ten obtained resin molded products, the number of resin molded products on which striae were not observed was two, and thus the generation of striae was evaluated as X.

Comparative Example 3

ZELEC UN (acidic phosphoric acid ester: registered trademark, manufactured by Stepan Company) (0.1 parts), VIOSORB 583 (ultraviolet absorber: registered trademark, manufactured by Kyodo Chemical Co., Ltd.) (1.5 parts), 2, 5 (6)-bis(isocyanatomethyl)-bicyclo[2.2.1] heptane (50.6 parts), and 1-benzyl-2-methylimidazole (0.03 parts) were mixed together, the components were stirred and dissolved at room temperature for 15 minutes, thereby preparing a polyisocyanate solution. During the preparation of this polyisocyanate solution, the generation of foams was confirmed. Pentaerythritol tetrakis(3-mercaptopropionate) (23.9 parts) and 4-mercaptomethyl-1,8-dimercapto-3,6-dithiaoctane (25.5 parts) were mixed together, and the components were stirred and dissolved at room temperature for 30 minutes, thereby preparing a polythiol solution. The polyisocyanate solution and the polythiol solution were mixed together in the full amount, and the components were stirred and mixed together at room temperature, thereby obtaining a homogeneous solution of a monomer mixture. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.60, an Abbe number (υe) of 39, and heat resistance at 112° C. There were some resin molded products on which striae and foreign material were slightly observed. Out of ten obtained resin molded products, the number of resin molded products on which striae were not observed was two, and thus the generation of striae was evaluated as X.

Comparative Example 4

ZELEC UN (acidic phosphoric acid ester: registered trademark, manufactured by Stepan Company) (0.1 parts), VIOSORB 583 (ultraviolet absorber: registered trademark, manufactured by Kyodo Chemical Co., Ltd.) (1.5 parts), and 2, 5 (6)-bis(isocyanatomethyl)-bicyclo[2.2.1]heptane (50.6 parts) were mixed together, the components were stirred and dissolved at room temperature for 15 minutes, thereby preparing a polyisocyanate solution. Pentaerythritol tetrakis (3-mercaptopropionate) (23.9 parts), 4-mercaptomethyl-1,8-dimercapto-3,6-dithiaoctane (25.5 parts), and 1-benzyl-2-methylimidazole (0.03 parts) were added to this polyisocyanate solution, and the components were stirred and mixed together at room temperature, thereby obtaining a homogeneous solution of a monomer mixture. In addition, during the preparation of this homogeneous solution of a monomer mixture, the generation of heat was confirmed. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.60, an Abbe number (υe) of 39, and heat resistance at 112° C. There were some resin molded products on which striae and foreign material were slightly observed. Out of ten obtained resin molded products, the number of resin molded products on which striae were not observed was one, and thus the generation of striae was evaluated as X.

Comparative Example 5

ZELEC UN (acidic phosphoric acid ester: registered trademark, manufactured by Stepan Company) (0.1 parts), VIOSORB 583 (ultraviolet absorber: registered trademark, manufactured by Kyodo Chemical Co., Ltd.) (1.5 parts), m-xylylene diisocyanate (52.0 parts), and 1-benzyl-2-methylimidazole (0.03 parts) were mixed together, and the components were stirred and dissolved at room temperature for 15 minutes, thereby preparing a polyisocyanate solution. During the preparation of this polyisocyanate solution, the generation of foams was confirmed. 4-Mercaptomethyl-1,8-dimercapto-3,6-dithiaoctane (48.0 parts) was added to this polyisocyanate solution, and the components were stirred and mixed together at room temperature, thereby obtaining a homogeneous solution of a monomer mixture. This homogeneous solution was degassed at room temperature under reduced pressure for 30 minutes, was filtered using a 1 μm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.67, an Abbe number (υe) of 31, and heat resistance at 85° C. There were some resin molded products on which striae and foreign material were slightly observed. Out of ten obtained resin molded products, the number of resin molded products on which striae were not observed was two, and thus the generation of striae was evaluated as X.

Comparative Example 6

ZELEC UN (acidic phosphoric acid ester: registered trademark, manufactured by Stepan Company) (0.1 parts), VIOSORB 583 (ultraviolet absorber: registered trademark, manufactured by Kyodo Chemical Co., Ltd.) (1.5 parts), m-xylylene diisocyanate (52.0 parts), and 1-benzyl-2-methylimidazole (0.03 parts) were mixed together, and the components were stirred and dissolved at room temperature for 15 minutes, thereby preparing a polyisocyanate solution.

4-Mercaptomethyl-1,8-dimercapto-3,6-dithiaoctane (48.0 parts) and 1-benzyl-2-methylimidazole (0.03 parts) were added to this polyisocyanate solution, and the components were stirred and mixed together at room temperature, thereby obtaining a homogeneous solution of a monomer mixture. In addition, during the preparation of this homogeneous solution of a monomer mixture, the generation of heat was confirmed. This homogeneous solution was degassed at room temperature under reduced pressure for 30 minutes, was filtered using a 1 µm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.67, an Abbe number (ue) of 31, and heat resistance at 85° C. There were some resin molded products on which striae and foreign material were slightly observed. Out of ten obtained resin molded products, the number of resin molded products on which striae were not observed was one, and thus the generation of striae was evaluated as X.

Comparative Example 7

ZELEC UN (acidic phosphoric acid ester: registered trademark, manufactured by Stepan Company) (0.1 parts), VIOSORB 583 (ultraviolet absorber: registered trademark, manufactured by Kyodo Chemical Co., Ltd.) (1.5 parts), m-xylylene diisocyanate (50.6 parts), and 1-benzyl-2-methylimidazole (0.03 parts) were mixed together, and the components were stirred and dissolved at room temperature for 15 minutes, thereby preparing a polyisocyanate solution. During the preparation of this polyisocyanate solution, the generation of foams was confirmed. "A polythiol including 4,8 and 4,7 and 5,7-dimercaptomethyl-1,11-dimercapto-3,6,9-trithiaundecane as a main component" (49.4 parts) was added to this polyisocyanate solution, and the components were stirred and mixed together at room temperature, thereby obtaining a homogeneous solution of a monomer mixture. This homogeneous solution was degassed at room temperature under reduced pressure for 30 minutes, was filtered using a 1 µm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.67, an Abbe number (ue) of 31, and heat resistance at 98° C. There were some resin molded products on which striae and foreign material were slightly observed. Out of ten obtained resin molded products, the number of resin molded products on which striae were not observed was three, and thus the generation of striae was evaluated as X.

Comparative Example 8

ZELEC UN (acidic phosphoric acid ester: registered trademark, manufactured by Stepan Company) (0.1 parts), VIOSORB 583 (ultraviolet absorber: registered trademark, manufactured by Kyodo Chemical Co., Ltd.) (1.5 parts), m-xylylene diisocyanate (50.6 parts), and 1-benzyl-2-methylimidazole (0.03 parts) were mixed together, and the components were stirred and dissolved at room temperature for 15 minutes, thereby preparing a polyisocyanate solution. "A polythiol including 4,8 and 4,7 and 5,7-dimercaptomethyl-1,11-dimercapto-3,6,9-trithiaundecane as a main component" (49.4 parts) and 1-benzyl-2-methylimidazole (0.03 parts) were added to this polyisocyanate solution, and the components were stirred and mixed together at room temperature, thereby obtaining a homogeneous solution of a monomer mixture. In addition, during the preparation of this homogeneous solution of a monomer mixture, the generation of heat was confirmed. This homogeneous solution was degassed at room temperature under reduced pressure for 30 minutes, was filtered using a 1 µm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.67, an Abbe number (ue) of 31, and heat resistance at 98° C. There were some resin molded products on which striae and foreign material were slightly observed. Out of ten obtained resin molded products, the number of resin molded products on which striae were not observed was two, and thus the generation of striae was evaluated as X.

Comparative Example 9

ZELEC UN (acidic phosphoric acid ester: registered trademark, manufactured by Stepan Company) (0.1 parts), VIOSORB 583 (ultraviolet absorber: registered trademark, manufactured by Kyodo Chemical Co., Ltd.) (1.5 parts), 2,5(6)-bis(isocyanatomethyl)-bicyclo[2.2.1]heptane (49.7 parts), and 1-benzyl-2-methylimidazole (0.03 parts) were mixed together, and the components were stirred and dissolved at room temperature for 15 minutes, thereby preparing a polyisocyanate solution. During the preparation of this polyisocyanate solution, the generation of foams was confirmed. Pentaerythritol tetrakis (3-mercaptopropionate) (24.4 parts) and "a polythiol including 4,8 and 4,7 and 5,7-dimercaptomethyl-1,11-dimercapto-3,6,9-trithiaundecane as a main component" (25.9 parts) were added to this polyisocyanate solution, and the components were stirred and mixed together at room temperature, thereby obtaining a homogeneous solution of a monomer mixture. This homogeneous solution was degassed at room temperature under reduced pressure for 30 minutes, was filtered using a 1 µm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.60, an Abbe number (ue) of 39, and heat resistance at 121° C. There were some resin molded products on which striae and foreign material were slightly observed. Out of ten obtained resin molded products, the number of resin molded products on which striae were not observed was three, and thus the generation of striae was evaluated as X.

Comparative Example 10

ZELEC UN (acidic phosphoric acid ester: registered trademark, manufactured by Stepan Company) (0.1 parts), VIOSORB 583 (ultraviolet absorber: registered trademark, manufactured by Kyodo Chemical Co., Ltd.) (1.5 parts), and 2,5 (6)-bis(isocyanatomethyl)-bicyclo[2.2.1]heptane (49.7 parts) were mixed together, and the components were stirred and dissolved at room temperature for 15 minutes, thereby preparing a polyisocyanate solution. Pentaerythritol tetrakis (3-mercaptopropionate) (24.4 parts), "a polythiol including 4,8 and 4,7 and 5,7-dimercaptomethyl-1,11-dimercapto-3,6,9-trithiaundecane as a main component" (25.9 parts), and 1-benzyl-2-methylimidazole (0.03 parts) were added to this polyisocyanate solution, and the components were stirred and mixed together at room temperature, thereby obtaining a homogeneous solution of a monomer mixture. In addition, during the preparation of this homogeneous solution of a monomer mixture, the generation of heat was confirmed. This homogeneous solution was degassed at room temperature under reduced pressure for 30 minutes, was filtered using a 1 µm TEFLON (registered trademark) filter, and then was injected into a mold made up of a glass mold and tape. The mold was injected into an oven, and the solution was slowly heated from 25° C. to 120° C. over 24 hours so as to be polymerized. After the polymerization, the mold was removed from the oven, and a product was released from the mold and then, furthermore, was annealed at 120° C. for two hours, thereby obtaining a resin molded product. The resin molded product had a colorless and transparent appearance, and had a refractive index (ne) of 1.60, an Abbe number (υe) of 39, and heat resistance at 121° C. There were some resin molded products on which striae and foreign material were slightly observed. Out of ten obtained resin molded products, the number of resin molded products on which striae were not observed was two, and thus the generation of striae was evaluated as X.

From the results of the examples and the comparative examples, it was confirmed that, when a polymerizable composition for optical materials obtained by mixing an imidazole-based curing catalyst with a thiol compound and mixing the obtained mixture with a polyisocyanate compound is used, optical materials in which the occurrence rate of striae is low, the generation of foreign material is suppressed, and, furthermore, properties such as the refractive index, the Abbe number, and the heat resistance are excellent in a balanced manner can be obtained, and the yield of optical materials improves.

The present application claims priority on the basis of Japanese Patent Application No. 2014-030885 filed on Feb. 20, 2014, the content of which is incorporated herein.

The invention claimed is:

1. A process for producing an optical material, comprising:
   a step of mixing di- or higher-functional thiol compounds (A) having one or more sulfide bonds and/or one or more ester bonds with an imidazole-based curing catalyst (B) to prepare a mixed solution;
   a step of mixing the mixed solution with an isocyanate compound (C) including at least one kind of a di- or higher-functional alicyclic isocyanate compound (c1) and/or a di- or higher-functional aliphatic isocyanate compound (c2) to prepare a polymerizable composition for optical materials;
   a step of injecting the polymerizable composition for optical materials into a mold; and
   a step of polymerization-curing the polymerizable composition for optical materials in the mold,
   wherein the imidazole-based curing catalyst (B) includes at least one kind of compounds represented by following General Formula (2):

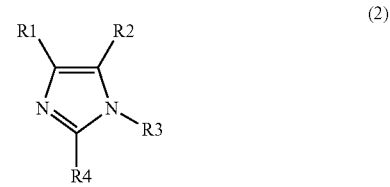

wherein, in the formula, each of R1, R2, and R3 independently represents hydrogen, a mercapto group, a cyano group, an optionally substituted alkyl group, or an optionally substituted phenyl group, R4 represents hydrogen, a cyano group, an optionally substituted alkyl group, or an optionally substituted phenyl group, and R1,R2, R3,and R4 may be identical to or different from each other, and
   wherein the molar ratio of mercapto groups in the thiol compounds (A) to isocyanate groups in the isocyanate compound (C) is 0.8 to 1.2.

2. The process for producing an optical material according to claim 1,
   wherein the imidazole-based curing catalyst (B) is at least one kind selected from the group consisting of dimethylimidazole and benzylmethylimidazole.

3. The process for producing an optical material according to claim 1,
   wherein the alicyclic isocyanate compound (c1) is at least one kind selected from the group consisting of 1,3-bis(isocyanatomethyl)cyclohexane, 1,4-bis(isocyanatomethyl)cyclohexane, bis(4-isocyanatocyclohexyl)methane, bis(isocyanatomethyl)-bicyclo[2.2.1]heptane, and isophorone diisocyanate, and
   the aliphatic isocyanate compound (c2) is at least one kind selected from the group consisting of m-xylylene diisocyanate, 1,5-pentamethylene diisocyanate, 1,6-hexamethylene diisocyanate, 1,7-heptamethylene diisocyanate, lysine diisocyanate, lysine triisocyanate, dimer acid diisocyanates, octamethylene diisocyanate and decamethylene diisocyanate, and modified products thereof.

4. The process for producing an optical material according to claim 1,
   wherein, among the thiol compounds (A), the di- or higher-functional thiol compound having one or more sulfide bonds is at least one kind selected from the group consisting of 4-mercaptomethyl-1,8-dimercapto-3,6-dithiaoctane, 4,8 or 4,7 or 5,7-dimercaptomethyl-1,11-dimercapto-3,6,9-trithiaundecane, bis(mercaptoethyl) sulfide, 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane.

5. The process for producing an optical material according to claim 1,
wherein, among the thiol compounds (A), the di- or higher-functional thiol compound having one or more ester bonds is at least one kind selected from the group consisting of pentaerythritol tetrakis(2-mercaptoacetate), pentaerythritol tetrakis(3-mercaptopropionate), and thiol compounds represented by following General Formula (1):

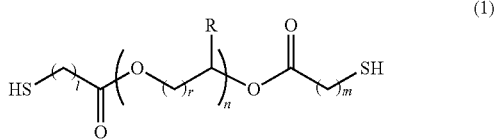

wherein, in the formula, I, m, and r independently represent integers of 1 to 4, and n represents an integer of 1 to 3, R represents hydrogen or a methyl group, and, in a case in which multiple R's are present, R's may be identical to or different from each other.

6. The process for producing an optical material according to claim 5,
wherein, in the thiol compounds represented by General Formula (1), I and m independently represent integers of 1 or 2, r represents an integer of 1 to 3, and n represents 1 or 2.

7. A process for producing a plastic eyeglass lens, comprising: the steps contained in the process according to claim 1.

8. The process for producing a plastic eyeglass lens according to claim 7, wherein a lens base material is prepared by using the step of polymerization-curing the polymerizable composition for optical materials in the mold, further comprising:
a step of forming a primer layer, a hard coat layer, and an antireflection layer in this order over at least one surface of the lens base material.

9. A process for producing a plastic polarizing lens, comprising:
a step of fixing a polarizing film to an inside of a mold for lens casting in a state in which at least one surface of the polarizing film is separated from the mold;
a step of mixing di- or higher-functional thiol compounds (A) having one or more sulfide bonds and/or one or more ester bonds and an imidazole-based curing catalyst (B) to prepare a mixed solution;
a step of mixing the mixed solution with an isocyanate compound (C) including at least one kind of a di- or higher-functional alicyclic isocyanate compound (c1) and/or a di- or higher-functional aliphatic isocyanate compound (c2) to prepare a polymerizable composition for optical materials;
a step of injecting the polymerizable composition for optical materials into a space between the polarizing film and the mold; and
a step of polymerization-curing the polymerizable composition for optical materials to laminate a layer comprised of a polythiourethane resin over at least one surface of the polarizing film.

* * * * *